US012782312B2

(12) United States Patent
Margarit Taule et al.

(10) Patent No.: US 12,782,312 B2
(45) Date of Patent: Nov. 3, 2026

(54) NEUROCOMPUTATIONAL ELECTROCHEMICAL SENSING DEVICE FOR PREDICTING PROPERTIES OF A SUBSTANCE

(71) Applicants: UNIVERSITÄT ZÜRICH, Zurich (CH); CONSEJO SUPERIOR DE INVESTIGACIONES CIENTÍficas, Madrid (ES)

(72) Inventors: Josep Maria Margarit Taule, Barcelona (ES); Shih-Chii Liu, Zurich (CH); Cecilia Jimenez Jorquera, Barcelona (ES)

(73) Assignees: UNIVERSITÄT ZÜRICH, Zurich (CH); CONSEJO SUPERIOR DE INVESTIGACIONES CIENTÍFICAS, Madrid (ES)

( * ) Notice: Subject to any disclaimer, the term of this patent is extended or adjusted under 35 U.S.C. 154(b) by 443 days.

(21) Appl. No.: 18/293,609

(22) PCT Filed: Jul. 18, 2022

(86) PCT No.: PCT/EP2022/069999
§ 371 (c)(1),
(2) Date: Jan. 30, 2024

(87) PCT Pub. No.: WO2023/006465
PCT Pub. Date: Feb. 2, 2023

(65) Prior Publication Data

US 2024/0337619 A1 Oct. 10, 2024

(30) Foreign Application Priority Data

Jul. 30, 2021 (EP) .................................... 21188804

(51) Int. Cl.
*G01N 27/327* (2006.01)
*G01N 27/27* (2006.01)
(Continued)

(52) U.S. Cl.
CPC ....... *G01N 27/3273* (2013.01); *G06N 3/0499* (2023.01); *G06N 3/06* (2013.01);
(Continued)

(58) Field of Classification Search
CPC G06N 3/02; G06N 3/04; G06N 3/049; G06N 3/0499; G06N 3/06; G06N 20/00;
(Continued)

(56) References Cited

U.S. PATENT DOCUMENTS

2018/0217086 A1 8/2018 Garzon et al.
2019/0095793 A1* 3/2019 Fink ......................... G06N 3/08
(Continued)

FOREIGN PATENT DOCUMENTS

EP 3862930 A1 8/2021

OTHER PUBLICATIONS

Maschenko et al., “On the feasibility to apply a neural network processor for analyzing a gas response of a multisensor microarray”, Article, 2013, vol. 190, pp. 61-65, Sensors and Actuators A.
(Continued)

*Primary Examiner* — Shane D Woolwine
(74) *Attorney, Agent, or Firm* — Hayes Soloway P.C.

(57) ABSTRACT

A neurocomputational electrochemical sensing device is for predicting properties of a substance. The device includes: a plurality of electrochemical sensors constituting a sensor array. The sensors are sensitive to attributes advantageous to predict a set of properties of interest of the substance. Each sensor is configured to output a sensor output signal indicative of a sensor response of the respective sensor to measurable changes in the sensed attributes of the substance; a
(Continued)

readout circuit-(5) for biasing the sensors and for conditioning the sensor output signals into readout circuit output signals to facilitate further processing of the sensor responses. An artificial neural network processor processes the readout circuit output signals. The processor includes neurons interconnected by synapses and is configured to output a set of processor output signals whose signal values are indicative of the properties to predict.

14 Claims, 8 Drawing Sheets

(51) Int. Cl.

| | |
|---|---|
| ***G06N 3/02*** | (2006.01) |
| ***G06N 3/0499*** | (2023.01) |
| ***G06N 3/06*** | (2006.01) |
| ***G06N 20/00*** | (2019.01) |

(52) U.S. Cl.
CPC ............... *G01N 27/27* (2013.01); *G06N 3/02* (2013.01); *G06N 20/00* (2019.01)

(58) Field of Classification Search
CPC ........ G06N 20/10; G06N 20/20; G01N 27/27; G01N 27/3273
See application file for complete search history.

(56) References Cited

U.S. PATENT DOCUMENTS

| | | | | |
|---|---|---|---|---|
| 2020/0138344 | A1 | 5/2020 | Ben-Yoav et al. | |
| 2021/0158158 | A1 * | 5/2021 | Look | G06N 3/08 |

OTHER PUBLICATIONS

Wang et al., "Prediction of Gas Concentration Using Gated Recurrent Neural Networks", Conference Paper, 2020, pp. 178-182, IEEE International Conference on Artificial Intelligence Circuits and Systems (AICAS).
Shahid et al. "Least Squares Neural Network-Based Wireless E-Nose System Using an SnO2 Sensor Array", Article, 2018, vol. 18, No. 1446, 15 Pages, Sensors.
Sachenko et al., "Sensor Drift Prediction Using Neural Networks", Conference Paper, 2020, p. 88-92, Proceedings of the International Workshop on Virtual and Intelligent Measurement Systems.

* cited by examiner

NEUROCOMPUTATIONAL ELECTROCHEMICAL SENSING DEVICE FOR PREDICTING PROPERTIES OF A SUBSTANCE

CROSS-REFERENCE TO RELATED APPLICATIONS AND PRIORITY

This patent application claims priority from International Patent Application No. PCT/EP2022/069999 filed Jul. 18, 2022, which claims priority from European Patent Application No. 21188804.5 filed Jul. 30, 2021.

TECHNICAL FIELD

The present invention relates to a neurocomputational electrochemical sensing device, such as a transistor-based sensing device, for predicting dynamic (bio) chemical properties (i.e. dynamic properties which are chemical and that may relate to processes occurring within living organisms) of a substance. The device comprises an artificial neural network processor that is configured to be trained to compensate for sensor drift and cross-sensitivities. The invention equally relates to a method of operating the sensing device.

BACKGROUND OF THE INVENTION

Conceived to sense and qualify biological and chemical information beyond human capabilities, biochemical analytical systems are in rising demand to assist societies in applications like health, food safety, and environmental protection. The need to prevent and control critical situations in situ/vivo and in real time has pushed transduction into the nanoscale, packing multiple sensors into miniaturised, fast lab-on-a-chip designs. As sensors' density increases, their outputs grow in redundancy, complementariness, and dimensionality. However, with downscaling, noise increases while stability decreases. Such effects add to selectivity restraints long endured by chemical detectors, impairing the reliability of latest microanalytical integrations.

Among sensor alternatives, microelectrodes and field-effect transistors (FETs) fabricated in semiconductor technologies present advantages such as miniaturisation, mass fabrication, and easy integration with readout electronic circuitry that make them particularly suitable for incorporation into arrays for on-site measurements. Even though these devices are sensitive enough for a wide range of healthcare (e.g. bio-fluid analysis), environmental (e.g. water quality monitoring), and industrial (e.g. food quality control) applications, their commercial application in such settings is conditioned on aging and cross-sensitivities that can severely impair the reliability of the device. Aging is mainly caused by fouling and drifts due either to substance migration into or out of the sensing surface, or to surface hydration. Cross-sensitivity to temperature and interfering species can also constrain the reliability of the measurements, especially when the sensors operate in the field, out of a controlled experimental setup.

In this context, chemometrics is a promising tool to boost accuracy of the measurements and to translate them into actual biochemical knowledge discovery. By modelling the underlying relationships and structure between the measured properties of the chemical system, cross-sensitivity in sensor measurements can be exploited to calibrate for non-idealities, such as temperature, aging or contamination by other chemical species. These same models can be further used to predict complex biochemical parameters, to classify future samples, and to identify critical episodes. Classical chemometric solutions run analytics offline, trained on data batches containing steady-state responses or complete measurement cycles of the sensor array. In order to facilitate machine learning, input data is usually transformed into an intermediate space by means of unsupervised (e.g principal component analysis (PCA), self-organising maps, t-distributed stochastic neighbour embedding) or supervised (e.g. partial least squares) approaches. Linear and non-linear algorithms, such as discriminant analysis, k-means, k-nearest neighbours, support vector machines and random forests, run in a succeeding step to predict categorical or real-valued variables in the big biochemical data. Deep artificial neural networks (ANNs) provide scalable multilayer representations to fit the complexity of the problem in a single model, at the cost of strong computational requirements.

Most chemometrics, and especially deep ANN solutions, run aside on high-speed clocked, synchronous computers. Because most current integrated measuring devices read out the level of every analyte separately, storage and processing bottlenecks arise at the posterior processing stages. This results in higher latencies, higher energy consumption and limited miniaturisation.

On- and off-chip compensation methods have been proposed to overcome some of the above challenges to some extent. However, none of the former approaches addresses, for example, sensor cross-sensitivity to chemical and thermal interferents on-chip when monitoring continuous readings from the sensor array. Thus, the wide adoption of these analytical systems for industrial applications is still limited mainly due to sensor non-idealities, and due to the restricted deployability of these devices in terms of compactness and energy autonomy.

Current online (bio) chemical monitoring devices are generally expensive, bulky, non-predictive, limited to a fix set of a few properties, and require periodical calibration in front of environmental changes. Measurements not feasible with such specific equipment are conducted in laboratories with high associated costs and delays. If predictive models are used, then they are deployed in the cloud. This translates into privacy concerns and, again, into latencies due to data transmission, and additional storage and processing bottlenecks that accentuate as the volume of information accumulates over time.

US2020/138344 A1 discloses an electrochemical sensor comprising a counter electrode, optionally a reference electrode, and an array of multiple working electrodes, wherein at least one of the working electrodes is a film-coated electrode, and wherein the film-forming material has repeat unit that comprises six-membered non-aromatic ring. A device for electrochemical detection that comprises the sensor (an electrochemical tongue) and a method for detecting analytes with the aid of the sensor are also disclosed.

US2018/217086 A1 discloses a three-electrode mixed-potential electrochemical sensor coupled with an artificial neural network data analysis approach, which can extract concentrations from voltages and identify gas streams consisting of single and binary mixtures of $NO_2$, NO, CO, and $C_3H_8$. By using the data from the sensors in biased and unbiased mode, single and binary mixtures can be identified with >98% accuracy. The sensor is suitable for control and monitoring of diesel and gasoline engines, turbines, steam power plants, and other combustion technologies.

Publication "On the feasibility to apply a neural network processor for analyzing a gas response of a multisensor microarray" by A. A. Maschenko et al. describes an effort to implement a hardware neural network processor to carry out pattern recognition of signals generated by a multisensor microarray of electronic-nose type.

SUMMARY OF THE INVENTION

The objective of the present invention is thus to overcome at least some of the above limitations relating to bio (chemical) analytical systems.

According to a first aspect of the invention, there is provided a neurocomputational electrochemical sensing device for predicting properties of a substance as recited in claim 1.

The proposed device integrates a plurality of electrochemical sensors (e.g. solid-state electrochemical microsensors), which are sensitive to attributes advantageous to predict a set of properties of interest of the sensed substance, and which operate together with a readout circuit and an ANN processor. The readout circuit biases the sensors and converts their responses into signals conditioned to facilitate subsequent ANN processing into predictions of (bio) chemical properties of interest. The sensors, the readout circuit, and/or the ANN processor can be integrated in a common system substrate (e.g. silicon). The electrochemical sensing device may also integrate automated, miniaturised fluidics (e.g. micro-/nano-fluidics) to achieve precise manipulation and control of fluids and high-throughput analysis with low volume of fluids, chemicals, and reagents.

The proposed electrochemical-sensing analytical device provides at least some of the following advantages:

Reliability: The invention provides self-calibrated correction of multiple sensor non-idealities (e.g. aging, cross-sensitivities) in order to lengthen sensor lifetime when operating outside of controlled laboratory settings.

Miniaturisation: solid-state electrochemical (e.g. field-effect transistor (FET), microelectrodes) microsensors and processing circuits can be easily integrated in standard complementary metal-oxide-semiconductor (CMOS) very large-scale integration (VLSI) technologies.

Low cost: The present invention enables solid-state electrochemical monitoring, designed for cost-effective mass manufacturability at wafer level using standard CMOS electronic integration technologies.

Energy efficiency: The device is configured to carry out efficient, local readout encoding as early relevant features to facilitate prediction of target attributes. Signal processing in continuous time is also enabled to avoid redundant information and computation cycles, according to the dynamics of input signals and neural network, not at a fixed frequency provided by an external clock.

The present invention thus solves the technical problem of fabricating multiparametric analytical devices capable of precise sensing, capable of operating in tiny/mobile locations and in real time, and capable of predicting multiple ad-hoc parameters at low maintenance costs.

According to a second aspect of the invention, there is provided a method of operating the device as recited in claim 13.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which:

FIG. 7 schematically illustrates a second example implementation of the neurocomputational electrochemical sensing device; and.

DETAILED DESCRIPTION OF EMBODIMENTS OF THE INVENTION

Figure 1:
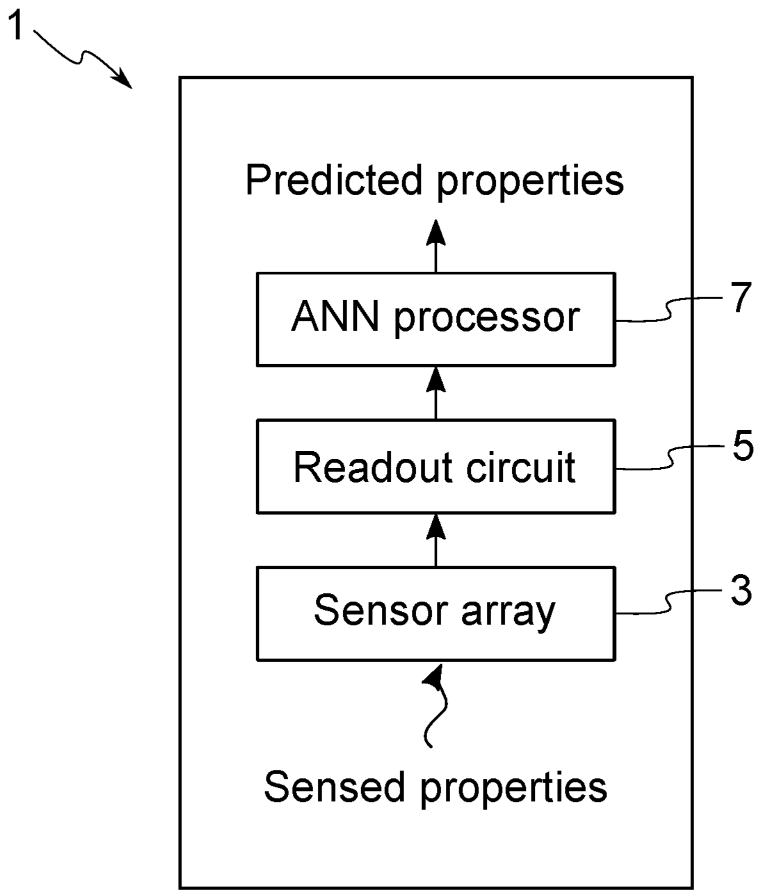
FIG. 1 shows a simplified block diagram illustrating a high-level system setup of the proposed device.

Some embodiments of the present invention will now be described in detail with reference to the attached figures. The non-limiting embodiments are described in the context of an electrochemical analysis (e.g. environmental/sanitary monitoring, health assessment from markers in biofluids, chemical process monitoring) of a substance, which in the present embodiments is a liquid. Identical or corresponding functional and structural elements which appear in different drawings are assigned the same reference numerals. It is to be noted that the use of words "first" and "second" may not imply any kind of particular order or hierarchy unless such order or hierarchy is explicitly or implicitly made clear in the context.

FIG. 1 shows a high-level system setup of the proposed electrochemical sensing device 1 for predicting properties of a substance, which in this example is a liquid. As depicted, the device comprises a plurality of electrochemical sensors forming a sensor array 3, where the sensors are sensitive to sensed attributes advantageous to predict a set of properties of interest of the substance, and that operate together with a readout circuit 5 and an ANN processor 7. The readout circuit biases the sensors and reads or transforms sensor responses to measurable changes in the sensed attributes into signals conditioned to facilitate subsequent ANN processing for predicting (bio) chemical properties of interest. Any one of the sensor array, the readout circuit, and the ANN processor can be integrated in a common system substrate (e.g. silicon). The electrochemical sensing device may also integrate automated, miniaturised fluidics (e.g. micro-/nano-fluidics) to achieve precise manipulation and control of fluids and high-throughput analysis with low volume of fluid samples, chemicals, and reagents so as to further reduce analytical costs. Thus, the system substrate may be integrated with the fluidics following a packaging scheme suitable for mass production (e.g. wafer-level production) with proper fluid isolation from electrical I/O signals, and adequate fluidic sealing on top of the system substrate (e.g. silicon or epoxy carriers for silicon system substrates).

Figure 2:
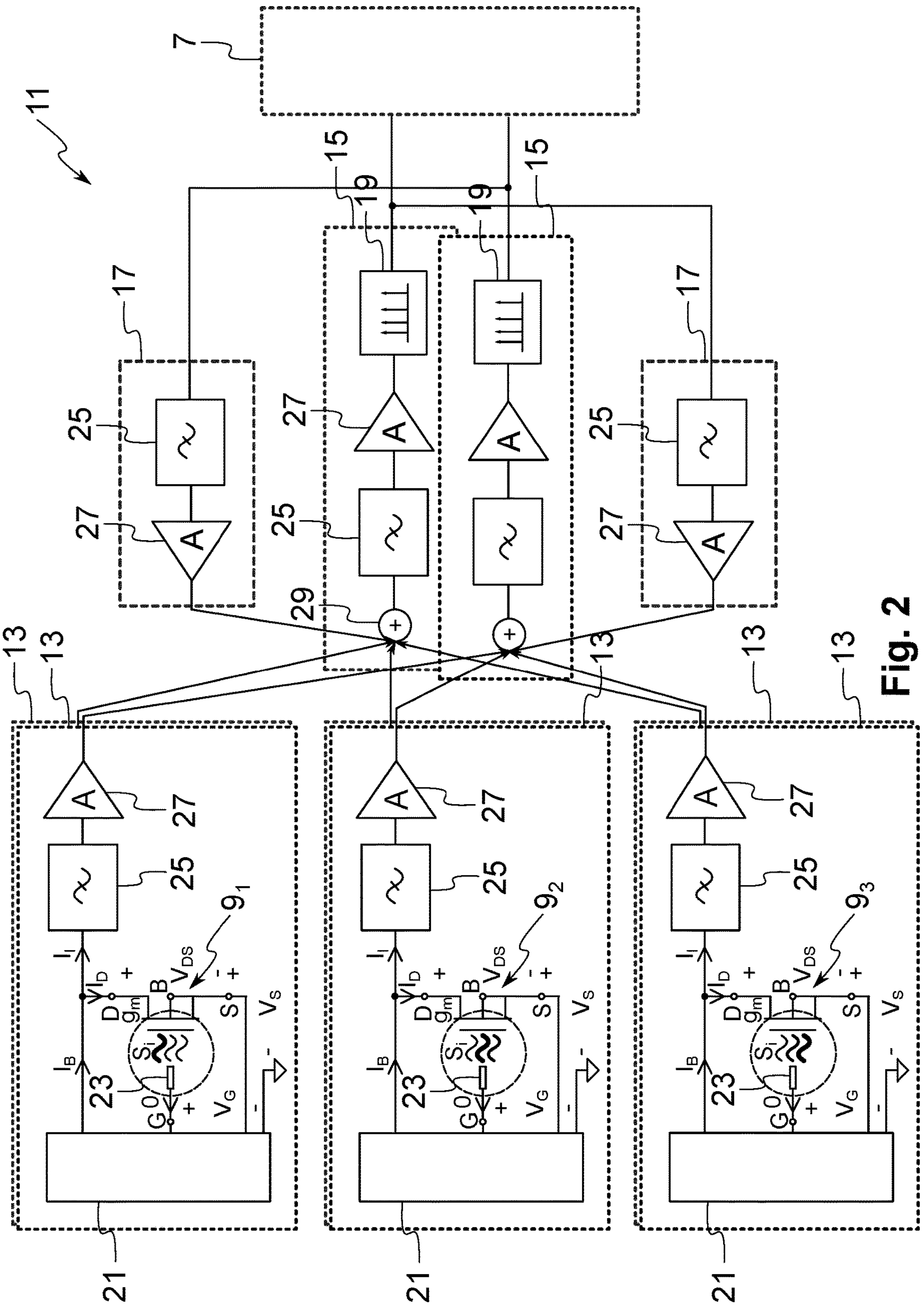
FIG. 2 shows an ANN pre-processor implementation according to a first embodiment, and which is based on amperometric sensing using FETs.

FIG. 2 schematically shows the readout circuit 5 together with the sensor array 3 according to the first embodiment.

According to this embodiment, the circuit forms an amperometric sensing circuit or element using FETs (e.g. ion-sensitive field-effect transistors (ISFETs), chemical field-effect transistors (CHEMFETs), and/or biosensor field-effect transistors (BIOFETs)) as sensors $9_1$, $9_2$, $9_3$.

The sensor array 3 comprises a plurality of sensors that, together with the readout circuit 5, perform as an artificial neural network pre-processor 11 mimicking the functioning or operation of (artificial) synapses and neurons. In FIG. 2, all the circuit elements apart from the sensors and the ANN processor 7 form the readout circuit. The following notations are used in FIG. 2: D denotes the drain node or terminal of the transistor, S denotes the source node or terminal of the transistor, G denotes the gate node or terminal of the transistor, B denotes the bulk node or terminal of the transistor, $I_B$ denotes the biasing current, $I_D$ denotes the drain current, $I_I = I_B - I_D$, $V_G$ denotes the gate voltage, $V_S$ denotes the source voltage, $V_{DS}$ denotes the drain-to-source voltage, $g_m$ denotes the transconductance of the transistor, and $S_i$ denotes the sensitivity of the sensor, i.e. the numerical relationship between each of the quantifiable sensed properties or analytes the sensors are sensitive to and the electrical signal they are converted to at the sensors.

Each sensor may be, to a certain extent, selective (i.e. mainly or predominantly sensitive) to a given property of a substance, but may also present some degree of cross-response to other properties sensed in the array. In FIG. 2, these different properties are represented by the wavy lines so that each wavy lines represents a given property of a liquid to be sensed. For instance, the uppermost wavy line may represent ion A concentration in the liquid to be sensed, the middle wavy line may represent ion B concentration in the liquid to be sensed, and the bottom wavy line may represent ion C concentration in the liquid to be sensed. For example, a first type of sensor $9_1$ may be selective to ion A concentration in the liquid to be sensed, while a second type of sensor $9_2$ may be selective to ion B concentration in the liquid, a third type of sensor $9_3$ may be selective to ion C concentration in the liquid. All sensors may also be highly sensitive to the temperature of the liquid, and an Nth type of sensor (not shown in FIG. 2) could be selective to this property. In FIG. 2, the line thickness of the wavy line indicates the degree of sensitivity to a given property so that the thicker the line, the higher the sensitivity is to that property. At the same time, the first type of sensor may also be somewhat sensitive to the other (bio) chemical parameters in the liquid and, in particular, to the ion B concentration and the ion C concentration, while the second type of sensor may also be somewhat sensitive to the ion A concentration and the ion C concentration, and the third type of sensor may also be somewhat sensitive to the ion A and B concentrations. In the example shown in FIG. 2, the sensor array includes a first set of first type of sensors (in this example comprising sensors $9_1$) selective to properties correlated with the desired properties to predict, but that may also present some degree of cross-sensitivity to other properties of the substance (i.e. interferents), and a second set of second type of sensors sensitive primarily to the main interferents of the substance: sensors $9_2$ mainly sensitive (i.e. mainly responsive to) to one of the interferents, and sensors $9_3$ mainly sensitive to another one of the interferents. All sensors may also be inherently significantly sensitive to temperature due to the joint electrochemical and solid-state nature of the sensors. The first type of sensors may thus be further sensitive at least to first interferents of the substance and/or second interferents of the substance, and second type of sensors may further be sensitive at least to the properties to predict and/or to the second interferents of the substance.

The artificial neural network processor 7 and the artificial neural network pre-processor 11 comprise two types of parts: multiple-input, single-output neurons N, connected by single-input, single-output synapses W, where the synapses have a direction associated with them. Readout input synapses 13 can be understood to be multi-property single-input, single-output synapses. All the neurons and synapses may comprise one or more integrator compartments, which are considered to integrate their inputs obeying dynamic equations (e.g. they act as leaky integrator compartments). Thus, in the present description, the synapses and neurons are configured to process their input signals to generate output signals.

Accordingly, when a signal passes through synapses and/or neurons, the resulting output signal may be considered to be a processed input signal. However, the verb "process" is to be understood broadly in the present description. In other words, the meaning of this word is understood to encompass any kind of operation applied to a signal. The neurons may transmit their outputs in the digital domain by performing analogue-to-digital conversion through a spike generator (i.e. asynchronous pulse modulation), or in the analogue domain by an analogue representation of their instantaneous firing rate. For the former purpose, the neurons may comprise spike generators 19 as shown in FIG. 2. The choice between the analogue and digital output signals depends on whether or not analogue-to-digital conversion is to be performed in the last compartment providing output of the neurons. Neural input signals come from sensed properties or other neurons through the synapses. Both the neurons and synapses can operate dynamically in continuous time (i.e. varying at any time instant) forming together a directed neural network exhibiting continuous-time dynamical behaviour. The ANN pre-processor comprises a sensing network of K readout input synapses 13 with a single integrator compartment, and a connection strength or weight given by the product of the corresponding sensitivity $S_i$, and an optional subsequent transconductance $g_m$ and/or readout input gain A. The readout input synapses 13 are connected to different readout neurons 15, which in this example are interconnected by readout recurrent synapses 17. The circuit parameters (e.g. $g_m$, A, poles of compartment filters, etc.) of the artificial neural network pre-processor synapses W and/or the artificial neural network pre-processor neurons N of the artificial neural network pre-processor 11 can be learned for the neural network to decompose the sensor output signals, i.e. in the configuration of FIG. 2 $I_I$, into informative, discriminating and/or independent features (i.e. individual properties or characteristics of the substance) next to the sensor, as efficient representations to facilitate modelling the dependencies among sensable (bio) chemical properties and to predict new output properties or behaviours of interest. In other words, the artificial neural network pre-processor synapses and/or the artificial neural network pre-processor neurons are configured to decompose the sensor output signals into informative, discriminating and/or independent properties or characteristics of the substance to facilitate modelling dependencies between any combination of sensable (bio) chemical properties and/or teaching signals y(t) representing the signals to predict by the artificial neural network processor 7. This strategy is useful for saving energy in information coding and for enhancing robustness in front of sensor noise, aging, and cross-sensitivities.

In the neurons and synapses of the artificial neural network processor 7 and the artificial neural network pre-processor 11, learning can be automated by using optimisation methods like gradient descent that minimise a loss computed from a loss function (e.g. Kullback-Leibler divergence, or possible simplified functional equivalents such as cross-entropy, negative log-likelihood, or (root) mean squared error) representing how well observed properties are modelled. Upon generating the artificial neural network processor output signals $\hat{y}(t)$, sensor drift may be compensated by modelling the temporal evolution of some given teaching signals y(t)—representing the signals to predict by the ANN processor—with respect to sensor output signals subject to temporal drift; cross-sensitivities may be compensated by modelling the underlying temporal relationships between (i) output signals from sensors selective to properties correlated with the desired properties to predict, (ii) output signals from sensors sensitive primarily to the main interferents, and/or (iii) the teaching signals y(t). The teaching signals may be used together with the output signals from the sensors sensitive primarily to the main interferents (ii) when the teaching signals (iii) are available. It is to be noted that the sensor output signals are also used for training, but they are not referred to as teaching signals in the present description. The teachings signals in the present description are only the signals teaching how the outputs should evolve in time. An embodiment of the invention may train neurons and synapses on a dataset collected offline via backpropagation to compute the gradients (or the surrogate gradients in the case of employing non-differentiable spikes as neuron outputs) of the loss function with respect to the circuit parameters. Both parts (i.e. the neurons and synapses) may be fine-trained online by using local plasticity rules to learn their corresponding parameters. For instance, any of the parameters modifying the overall synaptic weights in W could be learned combining homosynaptic Hebbian and heterosynaptic non-Hebbian rules. In periods when the temporal data of the output properties to predict is made available via teaching signals y(t), local plasticity rules could additionally be gated by error signals indicative of the contributions of each dynamical part to a prediction error depending on a difference between the teaching signals y(t), and the predicted ANN processor output signals $\hat{y}$ (t). Local plasticity rules update the parameters of synapses and neurons locally in space and time according to mathematical equations or learning rules which only use variables available in the neurons (e.g. integrated variables equivalent to postsynaptic currents or membrane potentials in biological neurons, pre- and post-synaptic traces, error signals, etc.). In this case, error backpropagation can be approximated by including biologically plausible neural networks with both feedforward and feedback synapses that allow the prediction errors made by the network to propagate in space and time through the network in the form of the aforementioned error signals.

As can be seen in FIG. 2, and besides the sensors, the readout input synapses 13 comprise a biasing circuit or element 21 for biasing the sensors $9_1$, $9_2$, $9_3$. This can be done for example by setting the voltage for a reference electrode 23 that is immersed in the liquid to be sensed, the source voltage $V_S$, and/or the biasing current $I_B$. In this manner, the biasing element sets the operating point of the FET. Biasing signals may be set in open or closed loop; in the second case, they depend on any of the electrical signals available at the readout circuit. The readout input synapses also comprise an integrator filter element 25 for filtering the sensor output signal, which in the example of FIG. 2 is $I_I$, and a given gain A 27 (which in this example is the gain mentioned above). It is to be noted that the gain A may be given by the same filtering element. The readout recurrent synapses 17 comprise one or more integrator compartments, which each are composed of an integrator filter element 25 with gain A 27, and optionally also summation elements 29 to combine the multiple compartments. The readout neurons 15, on the other hand, also comprise one or more integrator compartments, which each are composed of a summation element 29 to sum up the neural input signals and/or neuron biases (i.e. constant input values), an integrator filter element 25 with gain A 27, and optionally also of a spike generator 19 configured to generate a pulse when its input exceeds a given threshold, and/or additional summation elements 29. In the present embodiment, the compartment of the readout neurons 15 always includes a summation element 29 to sum up the neural input signals. In the configuration of FIG. 2, the readout neurons 15 and the readout recurrent synapses 17 comprise only one integrator compartment, but one or more of the neurons 15 and the readout recurrent synapses 17 could comprise a plurality of them where any compartment may be in a feedforward/feedback loop configuration by addition of more summation elements, or in a series configuration. The outputs of the readout input synapses 13 and the readout recurrent synapses 17 are connected to the readout neurons 15. The outputs of the readout neurons 15, which form readout circuit output signals, are in this example fed to the ANN processor 7. As was mentioned above, in the example of FIG. 2, the sensors are FETs, where the reference electrode 23 is configured to be in contact with the solution to be sensed, and configured to set an electric bulk potential in the solution. A sensing layer of the FET interacts with the solution comprising analytes for generating a potential change at the gate insulator surface dependent upon the concentration of the analytes in the solution and the sensitivity $S_i$ to each analyte. The current through the transistor will change according to such potential and to the transconductance $g_m$ of the transistor. The solution to be sensed may thus be understood to be part of the gate of the FETs.

Figure 3:
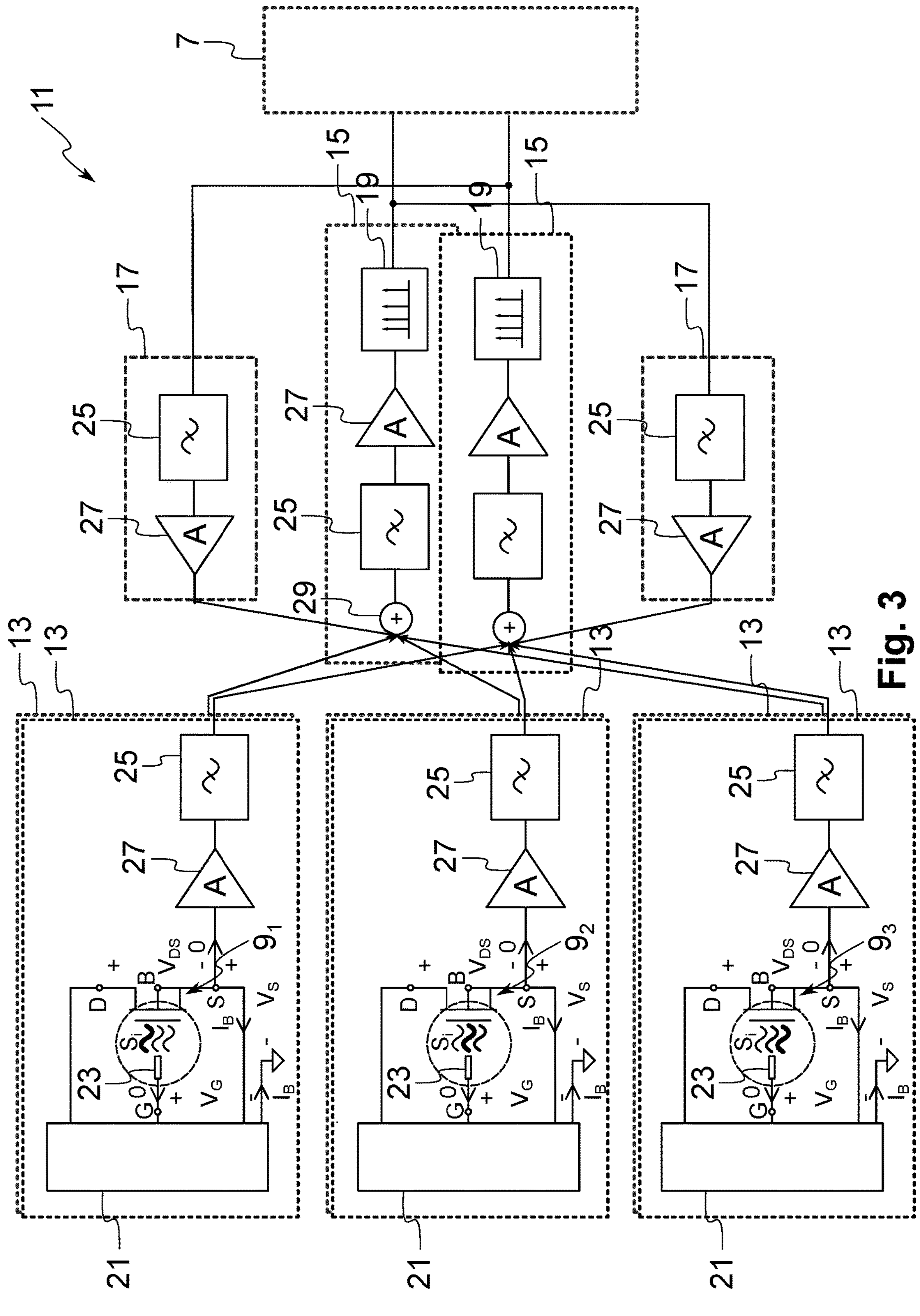
FIG. 3 shows an ANN pre-processor implementation according to a second embodiment, and which is based on potentiometric sensing using FETs.

The configuration of FIG. 3 is very similar to the configuration of FIG. 2, but with the difference that the sensing arrangement is a potentiometric sensing arrangement, and in particular a potentiometric FET sensing arrangement, that measures the voltage value of the sensors $9_1$, $9_2$, $9_3$. The readout synapses in this configuration comprise an amplifier 27 and a filter element 25. In this configuration, the biasing circuit biases the sensors $9_1$, $9_2$, $9_3$ by setting the voltage for a reference electrode 23 that is immersed in the liquid to be sensed, the drain-to-source voltage $V_{DS}$, and/or the biasing current $I_B$. The sensor output signal is the source voltage level $V_S$ at the source node S, and the sensor output current is negligible. The outputs of the readout input synapses are connected to the readout neurons 15.

Figure 4:
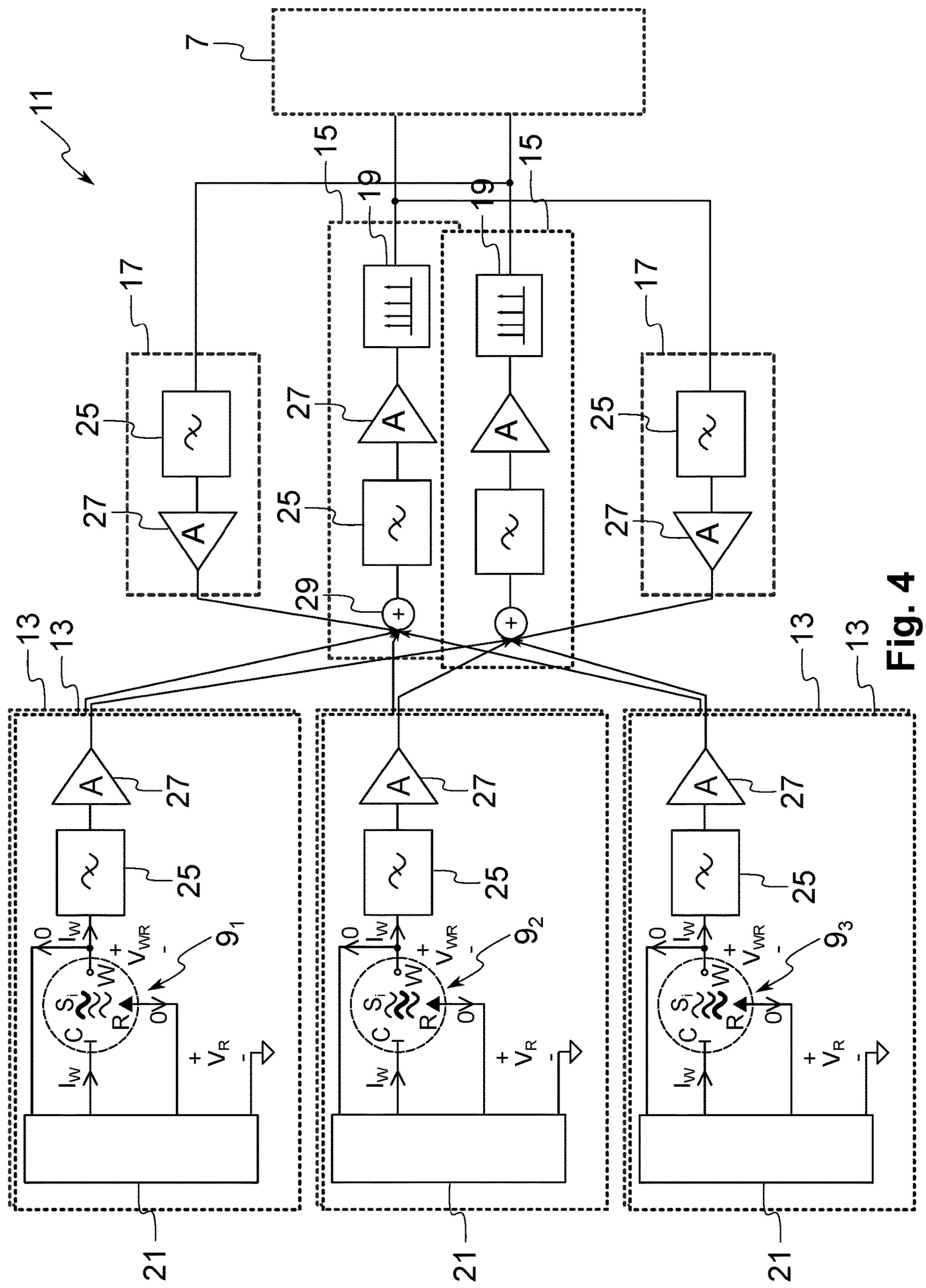
FIG. 4 shows an ANN pre-processor implementation according to a third embodiment, and which is based on amperometric sensing using three electrodes per sensor.

The configuration of FIG. 4 is also very similar to the configuration of FIG. 2, but with the difference that the respective sensing arrangement uses a three-electrode amperometric sensing arrangement. Thus, in this example, the respective sensors comprise three electrodes, namely a working electrode W, a reference electrode R, and a counter electrode C. $V_R$ denotes the voltage of the reference electrode R, $V_{WR}$ denotes the voltage between the working electrode W and the reference electrode R, while $I_W$ denotes the current flowing through the working electrode. In this configuration, the biasing circuit biases the sensors $9_1$, $9_2$, $9_3$ by setting $V_R$ and $V_{WR}$ to govern the current flowing through the working electrode $I_W$, which is the sensor output signal. $I_W$ is generated from an oxidising or reducing (redox) faradaic process taking place at the sensing surface of the W electrode, which depends upon the concentration of the analytes in the solution and the sensitivity $S_i$ to each analyte. The outputs of the readout input synapses are connected to the readout neurons 15.

Figure 5:
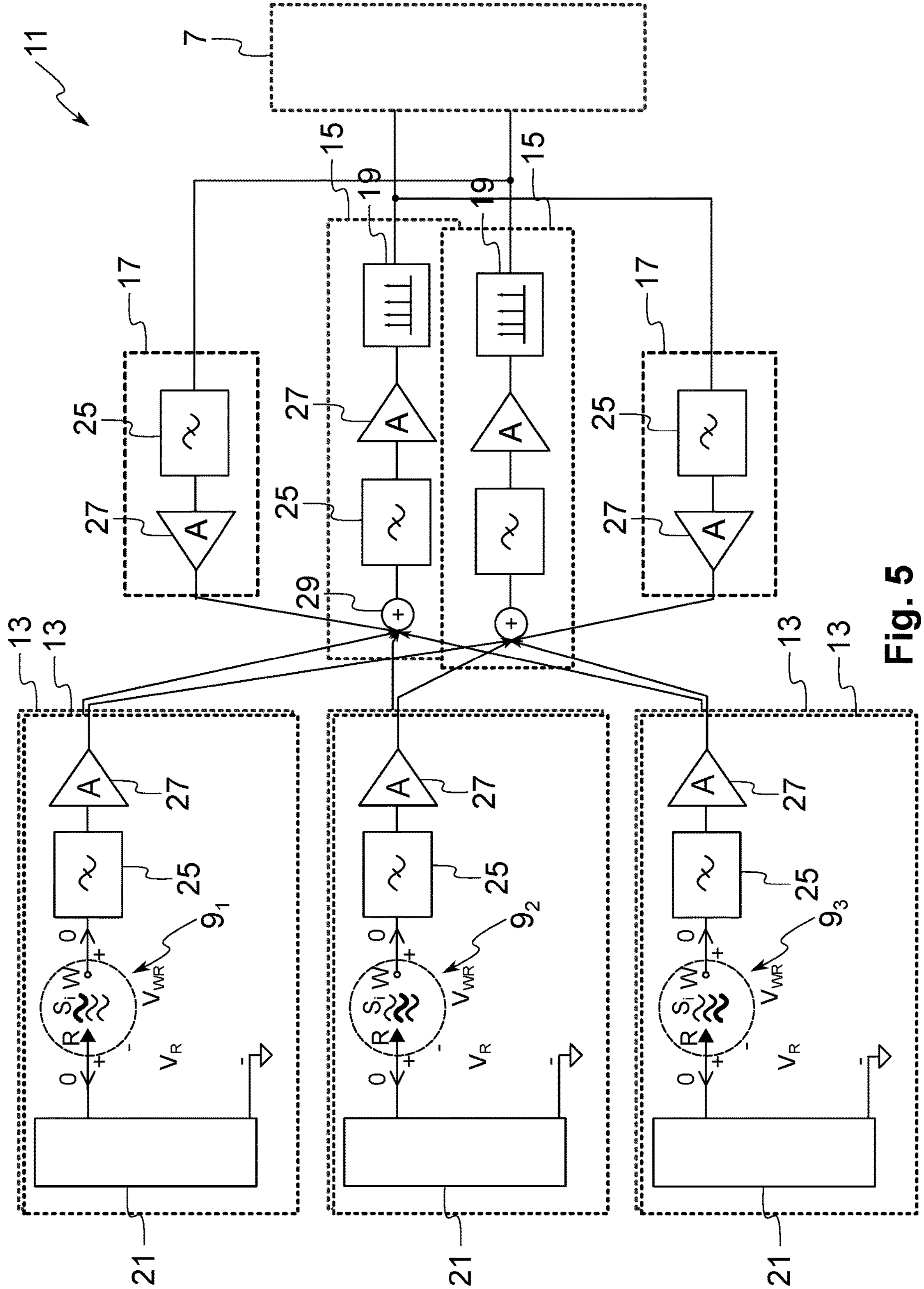
FIG. 5 shows an ANN pre-processor implementation according to a fourth embodiment, and which is based on potentiometric sensing using two electrodes per sensor.

The configuration of FIG. 5, on the other hand, is also very similar to the configuration of FIG. 4, but with the difference that the respective sensing arrangement uses a two-electrode potentiometric sensing arrangement. Thus, in this example the respective sensors comprise only two electrodes, namely a working electrode W, and a reference electrode R. In this configuration, the biasing circuit biases the sensors $\mathbf{9}_1$, $\mathbf{9}_2$, $\mathbf{9}_3$ by setting $V_R$. The sensor output signal is $V_{WR}$, a potential generated between the sensing surface of the electrode W in the solution and the reference electrode R. The potential depends upon the concentration of the analytes in the solution and the sensitivity $S_i$ to each analyte. The readout circuit presents very high input impedance (i.e. negligible $I_W$) to ensure changes in this signal can be attributed to analyte interactions at the electrode W—solution interface. The outputs of the readout input synapses are here again connected to the readout neurons 15.

Figure 6:
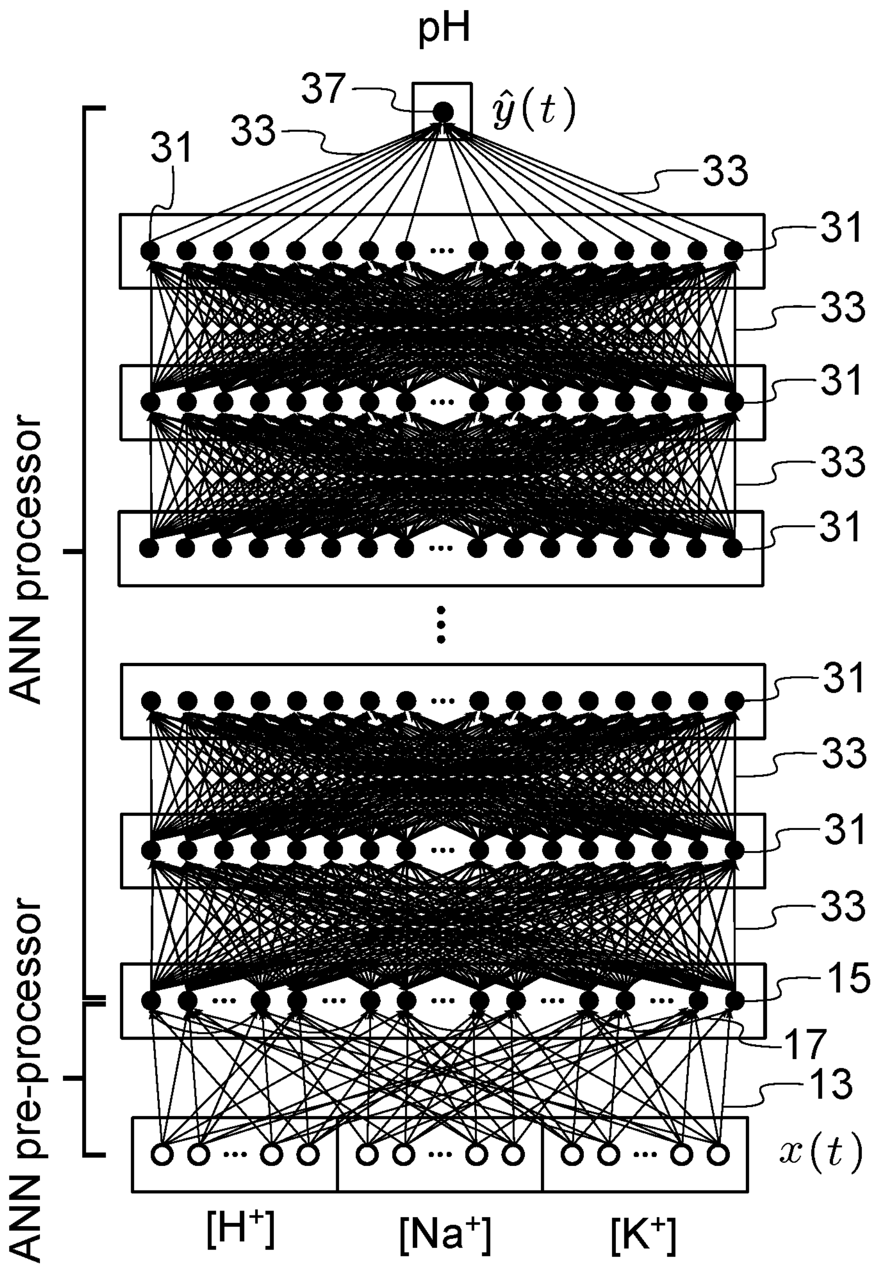
FIG. 6 schematically illustrates a first example implementation of the neurocomputational electrochemical sensing device.
Figure 7:
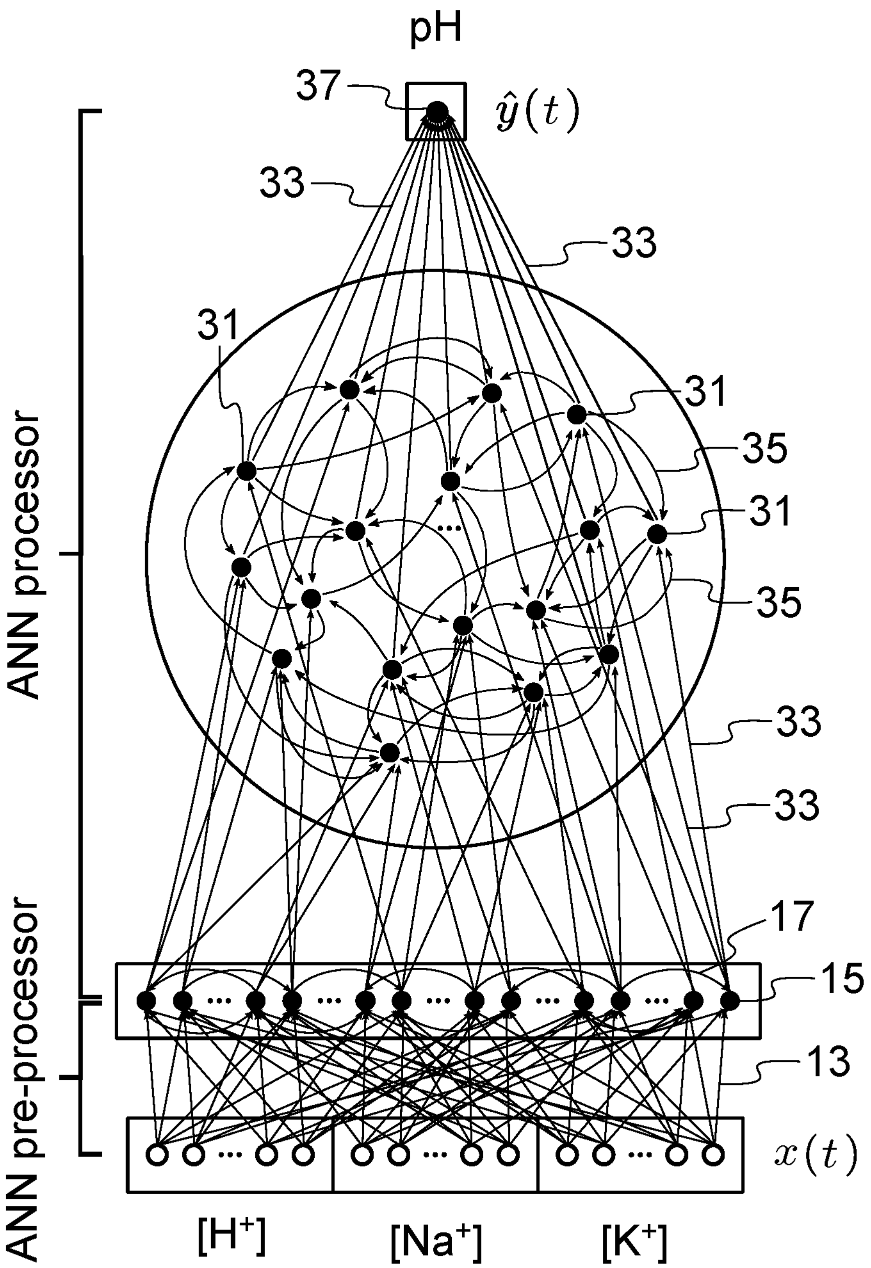

FIGS. 6 and 7 show two possible configurations or setups of the invention. In these specific examples, the sensed solution comprises hydrogen ions $H^+$, sodium ions $Na^+$, and potassium ions $K^+$, which are examples of the properties used to predict the properties of interest of the substance, i.e. the sensed solution. In FIGS. 6 and 7, the values of the properties to be sensed are illustrated with white circles with a black outline. In other words, the white circles with a black outline describe the values of the multi-property inputs of the readout input synapses in one particular sensor or moment in time, and can be more broadly denoted by x(t). Thus, the rectangles around these white circles with black outlines refer to the property the sensors are selective to. In this example, the predicted property is pH, i.e. the decimal logarithm of the reciprocal of the hydrogen ion activity, which is also responsible for the acidic or basic nature of the sensed solution. More broadly, in FIGS. 6 and 7, the value of the predicted property of the sensed solution at any given moment in time is given by $\hat{y}(t)$. In both setups of FIGS. 6 and 7, the readout input synapses 13 translate input properties (e.g. ions) into input signals of readout neurons 15 of a domain processable by such neurons as described above. As shown, at least some of the readout neurons 15 are interconnected by readout recurrent synapses 17. The resulting output representations of this ANN pre-processor are fed forward to an ANN processor 7, which in the setup of FIG. 6 comprises a feedforward neural network, and which in the setup of FIG. 7 comprises a recurrent neural network. The feedforward neural network in the specific case of FIG. 6 is a multi-layer perceptron, but the feedforward neural network could instead be any other feedforward network type, such as a (causal/dilated) convolutional neural network. In FIGS. 6 and 7, ANN neurons 15, 31, 37 are represented by black circles, while ANN synapses interconnecting the ANN neurons are represented with arrowed lines. In the setup of FIG. 6, the ANN processor synapses are ANN processor feedforward synapses 33, while in the setup of FIG. 7, the ANN processor synapses are ANN processor recurrent synapses 35 apart from the ANN processor feedforward synapses 33 connecting the ANN pre-processor or readout neurons 15 to the ANN processor neurons, and the ANN processor feedforward synapses 33 connecting the ANN processor neurons to an ANN processor output neuron 37, which is configured to output the value of the predicted property $\hat{y}(t)$.

Like the ANN pre-processor, the ANN processor feedforward synapses 33 and the ANN processor recurrent synapses 35 comprise one or more integrator compartments, which each are composed of an integrator filter element 25 with gain A 27, and optionally also summation elements 29. The ANN processor neurons 31, 37 also comprise one or more integrator compartments, which each are composed of a summation element 29 to sum up the neural input signals and/or neuron biases, an integrator filter element 25 with gain A 27, and optionally also of a spike generator 19 and/or additional summation elements 29. In the present embodiments, the compartment of the ANN processor neurons 31, 37 always includes a summation element 29 to sum up the neural input signals.

The artificial neural network processor 7 may thus be one of the following networks: a multi-layer perceptron, a convolutional neural network, a causal convolutional neural network, a dilated convolutional neural network, a recurrent neural network, or a combination of a convolutional neural network and a recurrent neural network. The output of at least one layer of the artificial neural network processor 7 may skip one or more following layers in the artificial neural network processor 7, and the output may be directly connected to the input of at least another succeeding layer of the artificial neural network processor 7 using skip feedforward connections or synapses. The readout circuit 5, on the other hand, may be understood as an artificial neural network layer according to any one of the following networks: a multi-layer perceptron, a convolutional neural network, a causal convolutional neural network, a dilated convolutional neural network, or a recurrent neural network.

Figure 8:
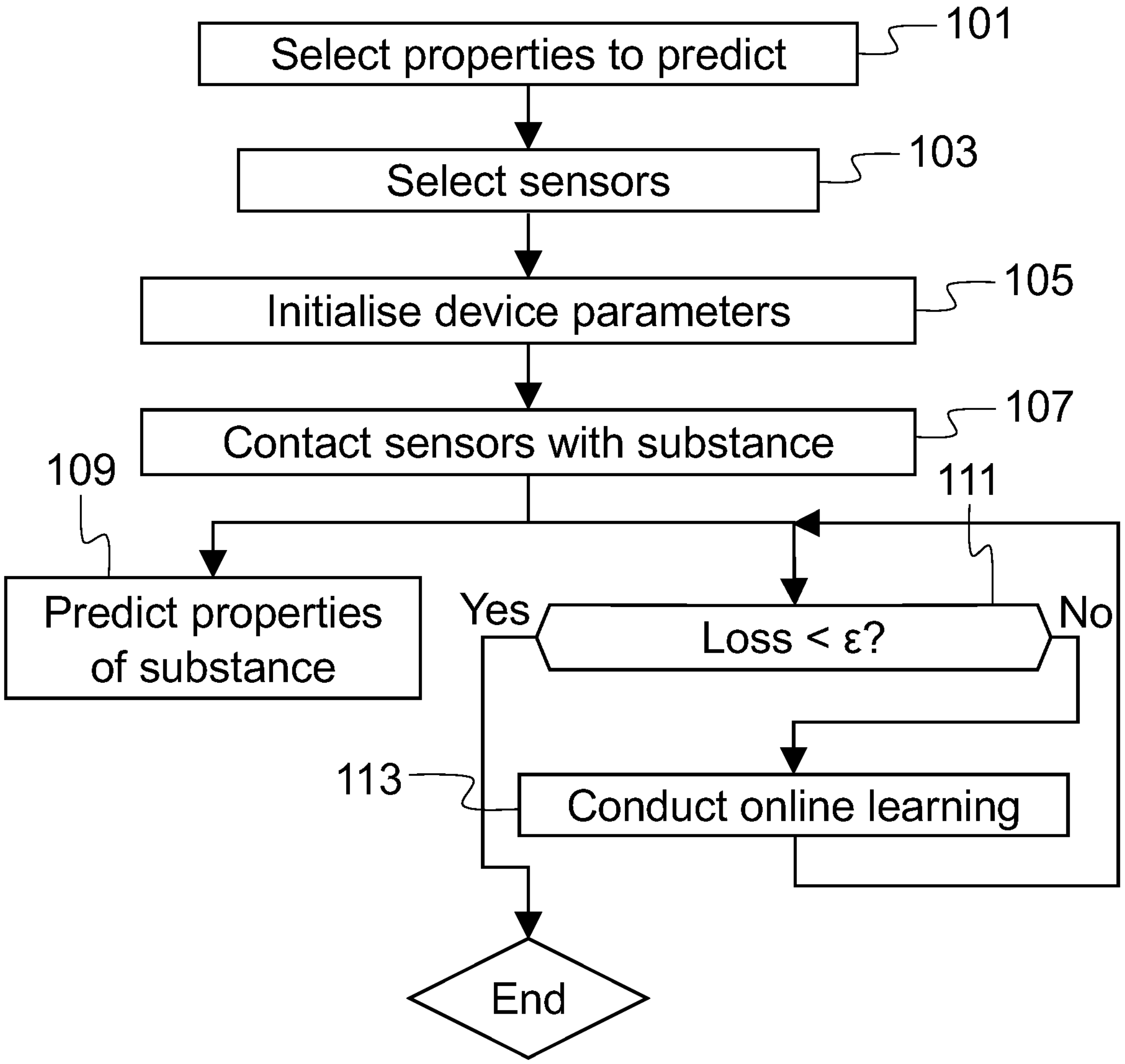
FIG. 8 is a flow chart illustrating the method of operating the neurocomputational electrochemical sensing device according to an example of the present invention.

The process of operating the neurocomputational electrochemical sensing device is next explained with reference to the flow chart of FIG. 8. In step 101, one or more properties to predict, such as the pH, of the substance are selected. This selection can be made for example by the operator of the device. In step 103, the sensors are selected that should sense the substance in the subsequent steps. This selection can be made by the operator, or the device can automatically select the sensors based on the knowledge of the properties to be predicted. The sensors are amperometric sensing electrodes, potentiometric sensing electrodes, amperometric sensing field-effect transistors, potentiometric sensing field-effect transistors, or any combination thereof. It is thus possible that not all of the output signals of the sensors of the sensor array are used to predict the output signals $\hat{y}(t)$. In step 105, the device parameters are initialised to e.g. the parameter values learned offline. More specifically, the parameters of the ANN processor 7 and the ANN pre-processor 11 are initialised. These parameters may be any of the following parameters: filter parameters, amplifier parameters, and the transconductance $g_m$. In step 107, the substance is contacted by the sensors. In step 109, the one or more properties of the substance are predicted. In step 111, it is determined whether or not a given loss, such as a (root) mean squared error prediction loss, is below a given threshold value ¿. If this is the case, then the process may be terminated, or at least the loss determination may be terminated. If on the other hand, in step 111 it was determined that the loss is not below the threshold value, then in step 113, online learning of the ANN processor and/or the ANN pre-processor is conducted in order to compensate for sensor drift and/or cross-sensitivities. It is to be noted that steps 111 and 113 may at least partially be carried out parallel with step 109, i.e. substantially at the same time as step 109.

The proposed device is particularly advantageous to correct sensor non-idealities and to predict (bio) chemical properties of a substance using multimodal raw measurements collected continuously from a sensor array with sensors selective to properties correlated with target properties to predict as per resemblance of the teaching signals y(t), and with sensors sensitive primarily to the main interfering analytes. The teaching signals y(t) can be used to calculate a prediction loss jointly with the predicted ANN processor output signals $\hat{y}(t)$. From a prediction loss including a prediction error term depending on a difference between the teaching signals y(t) and the predicted ANN processor output signals $\hat{y}(t)$, error backpropagation could be approximated by including both feedforward and feedback synapses. Such synapses would allow information about the prediction errors made by the network to propagate through the network in the form of the error signals. Drift and matrix effects severely impair both performance and lifetime of electrochemical sensors such as FETs, but according to the present invention, an artificial neural network can be embedded in the device to cross-compensate such effects by fusing interrelated readout data from multiple sensors.

The proposed device may serve as a portable, self-calibrated electrochemical monitor to provide cost-effective and reliable assessment of analytes detectable by FET-based sensors and/or microelectrode sensors, for instance. In some embodiments, the device comprises an array of FET sensors with electrolyte-gate interfaces functionalised to be selective to properties correlated with the analytes of interest, or sensitive primarily to the main interferents of the measurements. All sensors are inherently sensitive to temperature due to the joint electrochemical and solid-state nature of these devices. The sensor array is coupled to an ANN trainable with sensor readings collected in the field to model both the temporal characteristics of sensor responses and the underlying relationships between sensor input data to predict analyte concentrations while compensating for sensor drift and matrix effects. The artificial neural network processor synapses 33, 35 and/or the artificial neural network pre-processor synapses 13, 17 form a first-type dynamical part, and the artificial neural network processor neurons 31, 37 and/or the artificial neural network pre-processor neurons 15 form a different, second-type dynamical part. Instances of the first-type dynamical part are configured as single-input, single-output synapses, and instances of the second-type dynamical part are configured as multiple-input, single-output neurons. The artificial neural network processor synapses 33, 35 and/or the artificial neural network pre-processor synapses 13, 17 and/or the artificial neural network processor neurons 31, 37 and/or the artificial neural network pre-processor neurons 15 comprise one or more integrator compartments, the synapses and the neurons forming a directed neural network exhibiting continuous-time dynamical behaviour.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. Further variants of the invention may be obtained by combining any of the above teachings.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A neurocomputational electrochemical sensing device for predicting properties of a substance, the device comprising:

a plurality of electrochemical sensors constituting a sensor array, each electrochemical sensor being sensitive to sensed attributes for predicting properties of interest of the substance, each electrochemical sensor being configured to output a sensor output signal related to measurable changes in the sensed attributes of the substance;

a readout circuit for biasing the electrochemical sensors and for conditioning the sensor output signals into readout circuit output signals for further processing-said readout circuit output signals; and an artificial neural network processor for processing the readout circuit output signals, the artificial neural network processor comprising artificial neural network processor neuron elements interconnected by artificial neural network processor synapse elements, the artificial neural network processor being configured to output a set of artificial neural network processor output signals $\hat{y}(t)$ whose signal values are related to the properties of interest of the substance, wherein the electrochemical sensors of the sensor array comprise a first set of first electrochemical sensors mainly sensitive to properties correlated with the properties of interest to predict, and a second set of second electrochemical sensors sensitive to one or more main interferents of the substance, and wherein at least the artificial neural network is trained to compensate for sensor drift and sensor cross-sensitivities upon generating the artificial neural network processor output signals $\hat{y}(t)$ such that the sensor drift is compensated by modelling temporal evolution of teaching signals y(t) with respect to the sensor output signals subject to temporal drift, the teaching signals y(t) representing the temporal evolution of the properties of interest to be predicted by the artificial neural network processor, and such that the cross-sensitivities are compensated by modelling underlying temporal relationships between (i) sensor output signals related to the properties correlated with the properties of interest to predict, (ii) sensor output signals sensitive primarily to the one or more main interferents, and/or (iii) the teaching signals y(t).

2. The neurocomputational electrochemical sensing device according to claim 1, wherein one or more of: the readout circuit, the artificial neural network processor, and the electrochemical sensors of the sensor array are integrated in a common substrate.

3. The neurocomputational electrochemical sensing device according to claim 2, wherein the substrate is embedded into a common carrier integrating miniaturised structures of fluid manipulation and/or control suitable for wafer-level production.

4. The neurocomputational electrochemical sensing device according to claim 1, wherein the electrochemical sensors are amperometric sensing electrodes, potentiometric sensing electrodes, amperometric sensing field-effect transistors, potentiometric sensing field-effect transistors, or any combination thereof.

5. The neurocomputational electrochemical sensing device according to claim 1, wherein the readout circuit and the electrochemical sensors collectively constitute an artificial neural network pre-processor comprising artificial neural network pre-processor synapse elements and artificial neural network pre-processor neuron elements, the artificial neural network pre-processor synapse elements comprising readout input synapse elements configured to feed the sensor output signals as processed to the artificial neural network pre-processor neuron elements, and readout recurrent synapse elements interconnecting at least some of the artificial neural network pre-processor neuron elements.

6. The neurocomputational electrochemical sensing device according to claim 5, wherein the artificial neural network pre-processor synapse elements and/or the artificial neural network pre-processor neuron elements are configured to decompose the sensor output signals into properties or characteristics of the substance for modelling dependencies between any combination of sensable (bio)chemical properties and/or teaching signals y(t), representing the properties of interest to predict by the artificial neural network processor.

7. The neurocomputational electrochemical sensing device according to claim 5, wherein the artificial neural network processor synapse elements and/or the artificial neural network pre-processor synapse elements form a first-type dynamical part; and the artificial neural network processor neuron elements and/or the artificial neural network pre-processor neuron elements form a second-type dynamical part; wherein instances of the first-type dynamical part are configured as single-input, single-output synapse elements, and instances of the second-type dynamical part are configured as multiple-input, single-output neuron elements; and wherein the artificial neural network processor synapse elements and/or the artificial neural network pre-processor synapse elements and/or the artificial neural network processor neuron elements and/or the artificial neural network pre-processor neuron elements comprise one or more integrator compartments, such that the artificial neural network processor synapse elements, the artificial neural network pre-processor synapse elements, the artificial neural network processor neuron elements, and the artificial neural network pre-processor neuron elements form a directed neural network exhibiting continuous-time dynamical behaviour.

8. The neurocomputational electrochemical sensing device according to claim 5, wherein the artificial neural network processor neuron elements and/or the artificial neural network pre-processor neuron elements, and/or the artificial neural network processor synapse elements and/or the artificial neural network pre-processor synapse elements, are configured to be trained on a dataset collected offline by using a backpropagation optimisation method to minimise a Kullback-Leibler divergence loss function, or a simplified functional function equivalent to a Kullback-Leibler divergence loss function, with respect to parameters of the neurocomputational electrochemical sensing device.

9. The neurocomputational electrochemical sensing device according to claim 5, wherein the artificial neural network processor synapse elements and/or the artificial neural network pre-processor synapse elements, and/or the artificial neural network processor neuron elements and/or the artificial neural network pre-processor neuron elements are configured to be fine-trained online by using plasticity rules which only employ signals locally available in space and time in the respective neuron elements and synapse elements of the artificial neural network processor and/or the artificial neural network pre-processor, and that are propagated by feedforward and feedback synapse elements.

10. The neurocomputational electrochemical sensing device according to claim 1, wherein the artificial neural network processor is one of the following networks: a multi-layer perceptron, a convolutional neural network, a causal convolutional neural network, a dilated convolutional neural network, a recurrent neural network, or a combination of a convolutional neural network and a recurrent neural network.

11. The neurocomputational electrochemical sensing device according to claim 1, wherein an output of at least one layer of the artificial neural network processor skips one or more following layers in the artificial neural network processor, and the output is directly connected to an input of at least another succeeding layer of the artificial neural network processor using skip connections.

12. The neurocomputational electrochemical sensing device according to claim 1, wherein the readout circuit is an artificial neural network layer according to any one of the following networks: a multi-layer perceptron, a convolutional neural network, a causal convolutional neural network, a dilated convolutional neural network, or a recurrent neural network.

13. A method of predicting properties of a substance by using the neurocomputational electrochemical sensing device according to claim 1, the method comprising:

selecting properties of the substance to predict;

contacting the electrochemical sensors with the substance;

predicting the properties of the substance; and carrying out an online learning process in order to train at least the artificial neural network processor neuron elements and/or the artificial neural network processor synapse elements to compensate for sensor drift and/or cross-sensitivities upon generating the artificial neural network processor output signals $\hat{y}$.

14. The method according to claim 13, wherein the method further comprises determining whether or not a loss obtained by a learning-process is below a given threshold value, and carrying out the online learning process only if the loss is not below the given threshold value.

* * * * *